United States Patent
Crites

[11] 3,788,186
[45] Jan. 29, 1974

[54] STRESS INDICATION
[75] Inventor: Nelson A. Crites, Columbus, Ohio
[73] Assignee: Battelle Memorial Institute, Columbia, Ohio
[22] Filed: Nov. 19, 1971
[21] Appl. No.: 200,321

[52] U.S. Cl. ................................................. 85/62
[51] Int. Cl. .......................................... F16b 31/02
[58] Field of Search................... 85/62; 116/DIG. 34

[56] References Cited
UNITED STATES PATENTS
3,224,316 12/1965 Grikscheit et al. ..................... 85/62
3,561,260 2/1971 Reynolds ................................ 85/62
2,747,454 5/1956 Bowersett .............................. 85/62

*Primary Examiner*—Edward C. Allen

[57] ABSTRACT

A member having a region that may be subject to compressive stress and means in the region for indicating that a predetermined magnitude of such stress has been encountered.

A cavity extending inward from a surface has a piece of brittle material fitted snugly in it against, and protruding beyond, the rim of the cavity. The predetermined stress causes the piece to shear and break apart at the rim.

In a bolt, the cavity may be in the outer portion of the head, where the compression is responsive to tension in the shank. Or the cavity may be in the convex portion of a Belleville washer, to provide a measure of tension in the shank of a bolt that is tightened against it.

17 Claims, 4 Drawing Figures

PATENTED JAN 29 1974   3,788,186

STRESS INDICATION

This invention relates to stress indication. It has to do particularly with means for indicating that a predetermined magnitude of compressive stress has been encountered in a given region of a member. Such stress may be a function of another stress that is to be monitored in a different portion of the member. In fact an important use of the invention is in monitoring the levels of tension in the shank of a bolt so that the bolt can be tightened quickly to the proper level of tension without the risk of damaging it by forcing it too tight.

A major problem in the tightening of bolts is to determine when the bolt has been properly tensioned. Various means have been developed for determining the tension in bolts. However, all of them either are too expensive for practical use, are too complicated, or have other objectionable features. For example, torque wrenches are used to attempt to determine the bolt tension. It is, however, well known that torque wrenches do not provide a good measure of the tension in the bolt. What is actually measured is the torque, and this can vary from bolt to bolt for a given tension, depending upon the friction. Other means involve the use of expensive optical equipment, much of which is fragile and difficult to use. Other concepts involve special precision-machined parts that increase excessively the cost of the bolt.

This invention provides an inexpensive means for indicating bolt tension that can be made easily in mass production and can be accurately calibrated for the loads desired.

SUMMARY OF THE INVENTION

A typical member according to the present invention has a region that may be subject to compressive stress and means in said region for indicating that a predetermined magnitude of such stress has been encountered. The stress indicating means comprises a cavity extending inward from a substantially planar portion in the surface of the member, and a piece of brittle material therein fitted snugly against, and protruding beyond, the film thereof. The predetermined stress causes the brittle material to fracture substantially in the plane of the rim so that the protruding portion separates from the portion within the cavity.

The member may have a plurality of the indicating means, and each preferably is responsive to a different predetermined stress. The member may have projecting ridges or other similar means around the protruding portion of brittle material for protecting it from accidental contact with external shearing force. To make the separation easily noticeable, the outer surface of the protruding portion of brittle material may have a substantially different appearance, such as a substantially different color, than the portion within the cavity; or the visible area of the protruding portion of brittle material may be substantially larger than the area within the rim of the cavity. A typical cavity has substantially the shape of a right circular cylinder, another has substantially the shape of a truncated cone. In a conical cavity, the brittle piece typically has a notch adjacent the rim of the cavity. The size and shape of the notch help to determine the stress at which the brittle piece will break.

The compressive stress in the region of the cavity may be responsive to a bending moment in the member, and thus may be responsive to tensile stress in another portion of the member. In an especially useful embodiment of the invention, the member comprises a bolt, the region of the cavity is in the outer portion of the head, and the compressive stress in said region is responsive to tension in the shank.

The bolt may comprise means for providing a bending moment in the head responsive to tension in the shank, as where a peripheral annular area of the inner surface of the head protrudes beyond an adjacent interior annular area thereof to provide a bending moment in the head when it is tightened against a substantially planar surface. In a similar embodiment the inner surface of the head may be flat and the bolt is used in combination with a washer having an interior annular portion that is thinner than an adjacent peripheral annular portion thereof, the thinner portion fitting coaxially around the shank of the bolt and the thicker portion contacting a peripheral annular area of the inner surface of the head of the bolt.

Another typical embodiment, for measuring tension in the shank of a bolt, comprises a washer that is convex on one side and concave on the opposite side. The cavity extends inward from the convex surface. A Belleville-type washer may be used, the region subject to compressive stress being in the convex portion thereof.

DESCRIPTION OF PREFERRED EMBODIMENTS

Figure 1:
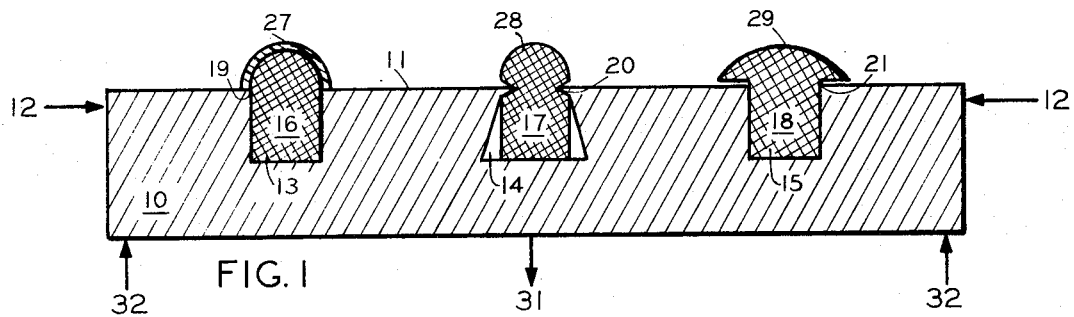
FIG. 1 is a sectional view of a member according to this invention.

Referring particularly to FIG. 1, a member 10 has a region at and adjacent to the upper surface 11 that may be subject to compressive stress as indicated at 12 and means in the region for indicating that a predetermined magnitude of such stress has been encountered. The stress indicating means comprises a cavity 13, 14, or 15 extending inward from a substantially planar portion in the surface 11 of the member 10, and a piece of brittle material 16, 17, or 18 therein fitted snugly against, and protruding beyond, the rim 19, 20, or 21 thereof, and the predetermined stress causes the brittle material 16, 17, or 18 to fracture substantially in the plane 11 of the rim 19, 20, or 21 so that the protruding portion separates from the portion within the cavity (as shown in FIG. 3).

Figure 2:
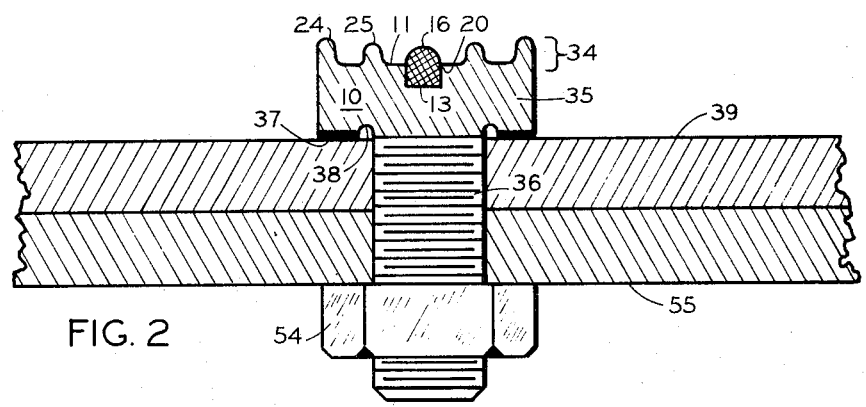
FIG. 2 is a sectional view of a typical embodiment of the invention for indicating tension in the shank of a bolt.
Figure 3:
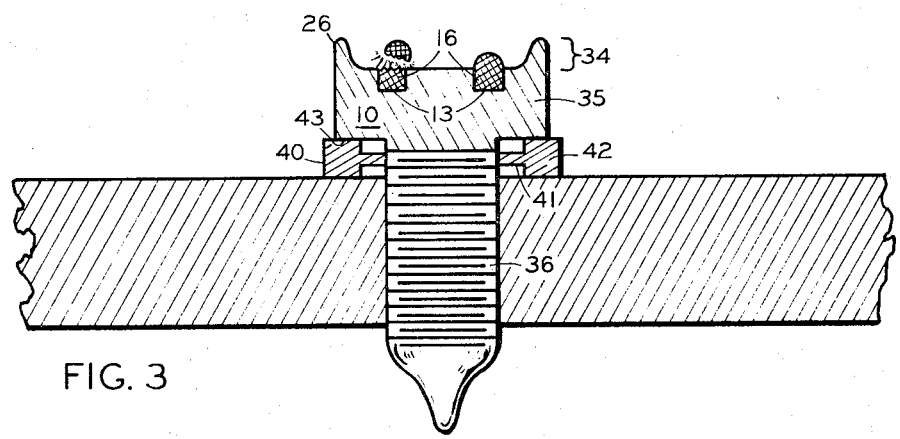
FIG. 3 is a sectional view of another embodiment of the invention somewhat similar to that of FIG. 2.

Of course, the member 10 may have a plurality of the indicating means, as shown also in FIG. 3, each preferably being responsive to a different predetermined stress. The member 10 may have means, such as the annular projecting ridges 24 and 25 in FIG. 2 and 26 in FIG. 3, around the protruding portion of the brittle material for protecting it from accidental contact with external shearing force.

In FIG. 1, the outer surface 27 of the protruding portion of brittle material 16 has a substantially different appearance, such as a substantially different texture or color, than the portion within the cavity 13. Thus, when the protruding portion separates from the rest, the appearance is noticeably changed. Another way to provide an easily noticed contrast in appearance is to make the visible area of the protruding portion 28 or 29 of brittle material 17 or 18 substantially larger than the area within the rim of the cavity 14 or 15, as in FIG. 1. To avoid affecting the calibration, and to enable the protruding portion 28 or 29 to separate easily and cleanly, it should not be bonded to the surface 11.

Each cavity 13, 15 in FIG. 1 has substantially the shape of a right circular cylinder, while the cavity 14 has substantially the shape of a truncated cone. The brittle piece 17 has a notch as shown in FIG. 1 adjacent the rim 20 of the cavity 14. The size and shape of the notch may be different in different pieces depending on the predetermined stress that each is to be responsive to.

The compressive stress at 12 in the region of interest may be responsive to another condition, such as a bending moment in the member as provided by a downward force 31 in an interior portion of the member 10 opposed by upward forces 32 adjacent its periphery. Thus, the compressive stress in the upper region may be responsive to tensile stress 31 in another (lower) portion of the member 10.

The present invention is especially useful where the member 10 comprises a bolt, as in FIGS. 2 and 3, and the region subject to compressive stress is in the outer portion 34 of the head 35, the compressive stress in the region 34 being responsive to tension in the shank 36. In FIG. 2, the bolt 10 comprises means for providing a bending moment in the head 35 responsive to tension in the shank 36, as a peripheral annular area 37 of the inner surface of the head 35 protrudes beyond an adjacent interior annular area 38 thereof to provide a bending moment in the head 35 when it is tightened against a substantially planar surface 39. In FIG. 3, the bolt 10 is used in combination with a washer 40 having an interior annular portion 41 that is thinner than an adjacent peripheral annular portion 42 thereof, the thinner portion 41 fitting coaxially around the shank 36 of the bolt 10 and the thicker portion 42 contacting a peripheral annular area 43 of the inner surface of the head 35 of the bolt 10. The thinner portion 41 of the washer 40 accurately centers the thicker portion 42 coaxially with the bolt head 35. The thicker portion 42 may protrude both above and below the thinner portion 41 as in FIG. 3, or it may extend in one direction only, either up or down, as desired.

Figure 4:
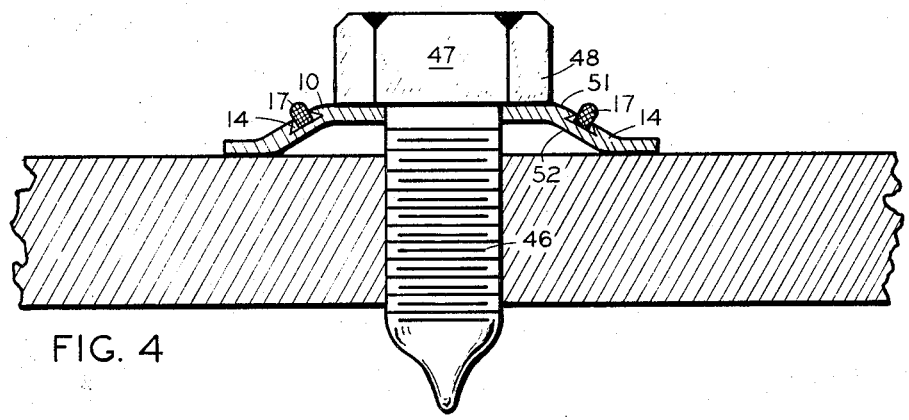
FIG. 4 is a partly sectional view of a further embodiment wherein a washer of the Belleville type provides stress indications related to tension in the shank of a bolt.

In FIG. 4, the objective is to provide indications responsive to tension in the shank 46 of a bolt 47. The head 48 of the bolt 47 is tightened against the measuring member, which in this arrangement comprises a washer 10 that is convex on one side 51 and concave on the opposite side 52. Each cavity 14 extends inward from the convex surface 51. The washer 10 typically comprises a Belleville-type washer, and the region subject to compressive stress is in the convex portion 51 thereof.

Thus, the invention comprises essentially a member at least a portion of which may be subjected to compressive stress and which contains means for indicating a predetermined magnitude of such stress, when encountered. In a portion of the member that is subjected to compressive stresses is a cavity (or cavities) extending inward from a substantially planar portion of the surface of the member. In each cavity a brittle material is bonded or fitted tightly in such a way that a portion of the material protrudes beyond the rim of the cavity. At a predetermined compressive stress in the member, the brittle material is caused to shear or fracture substantially in the plane of the rim so that the protruding portion of the brittle material separates from the portion that is within the cavity.

The basic load-indicating means can have a variety of embodiments. For example, the top surface 11 may be that of a bolt head 35 having a cavity 13 extending downward or inward from the center as in FIG. 2. The cavity 13 is filled with material 16 such as brittle epoxies or various types of ceramic. The material 16 extends slightly beyond the rim 20 of the cavity 13. The material 16 can be extended into the cavity 13 in the form of a paste or a thixotropic liquid. After the material 16 is placed in the cavity 13, and the extended top portion is rounded, the material is hardened by curing or firing to form a solid brittle piece 16. So that compressive stresses will be provided in the top planar surface 11 of the head 35 of the bolt 10, material should be removed at 38 from the underside of the bolt head 35, adjacent the shank of the bolt. The amounts of undercutting and clearance regulate the magnitudes of compressive stress that are obtained on the top planar surface 11 of the head 35 when the bolt 10 is tensioned. A flat annular portion 37 in the outer part of the underside of the head 35 of the bolt 10 serves as a bearing area, and should be wide enough to prevent it from penetrating the contacting surface 39.

In a typical use, the bolt 10 is positioned and the nut 54 is tightened against the surface 55. As the bolt 10 is tightened progressively, the head 35 pulls toward the surface 39 of the material in which the bolt 10 was placed, thus putting the top surface 11 of the bolt 10 into compression. As the top surface 11 goes into compression a pinching or shearing action takes place on the portion of the brittle material 16 extending above the rim 20 of the cavity 13. The brittle or shear characteristics of the material are so adjusted that the protruding portion breaks clean at the surface 11 when the desired amount of tension is reached in the bolt shank 36. Thus, when the top portion of the piece of brittle material 16 extending above the planar surface 11 of the bolt head 35 is sheared off, the desired tension in the bolt 10 will have been reached.

Another useful embodiment of this invention includes a bolt with a head made in substantially the same manner as described above with the exception that two or more cavities are made in the top planar portion of the bolt head as in FIGS. 1 and 3, and materials of different shear sensitivities are placed in these cavities. Thus, as the bolt is tensioned each material shears at successive tension loads. In such an embodiment several tension loads can be predetermined.

In all of these embodiments the protruding portion of the brittle materials preferably is colored or textured differently from the interior color or texture of the brittle material. Thus, when the protruding portion is sheared off as a result of tensioning the bolt, the changing color or texture can be noted more readily as the calibrated load is reached.

Another embodiment may include a bolt head having a conical cavity such as the cavity 14 in FIG. 1 extending downward from the center of the top planar surface, having the shape of a truncated cone with the larger base of the cone being the bottom surface. The cavity may have in it a piece of brittle material 17, cylindrical in shape, with an annular notch near the top portion of the cylinder and contiguous with the rim 20 of the cavity 14, with the top portion 28 of the cylinder 17 extending above the rim 20 of the conical cavity 14. The bolt head may have an undercut 38 under the head with a circular land portion 37 acting as a bearing area as in FIG. 2, or it may have a flat inner surface bearing against an undercut washer 40 as in FIG. 3. As the bolt is tensioned, compressive stresses in the top surface of the bolt head provide a pinching or shearing action on the notch at 20 in the brittle cylinder 17 resulting in the top portion 28 being sheared off, and indicating that a predetermined tension load has been reached in the shank of the bolt.

Still another embodiment may include a resilient washer between the bolt head and a surface against which the bolt is to be tightened. The washer typically is of the general Belleville design as in FIG. 4, with a pitch-angle and thickness selected to provide the proper compression strain on the upper surface 51 to shear the brittle materials 17 in the cavities 14 at the desired loads in the shank 46 of the bolt 47. As in the other embodiments the brittle materials may be put in one or more cavities as desired, each cavity having material that will shear at a different selected compressive strain level where a plurality of cavities are used, to indicate various tension loads in the shank 46 of the bolt 47. As the bolt is tightened, the protruding dome of each piece of brittle material shears off at the load level desired.

At least three convenient ways are available for predetermining and calibrating the indications of bolt-load tension. One is to adjust the compression strain in the upper planar surface of the bolt used so that varying amounts of strain can be produced to shear the brittle materials. The amount and shape of undercut on the underside of the bolt head (or in a washer used with it as in FIG. 3), the thickness of the bolt head, and the geometry of the bolt head are the principal governing factors in the amount of compressive strain for a given load.

Another way is to control the shear characteristics of the brittle material in each cavity. The shear characteristics of many brittle materials can be adjusted by controlling the density of the materials, their composition, and the processing procedures. For example, ceramic materials can be made progressively more brittle by firing at progressively higher temperatures. Also, the porosity of the ceramic tends to influence the brittle behavior. Plastic materials can be made more brittle by the addition of filler materials of the right types. Curing temperatures and the porosity can be so adjusted as to change the brittle nature of some plastic materials. Thus, a wide range of sensitivities in the shear characteristics of materials can be provided for use in adjusting the calibrated loads.

A third way to adjust the response levels is to vary the sizes and shapes of the cavities.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A member having a region that may be subject to compressive stress and means in said region for indicating that a predetermined magnitude of such stress has been encountered parallel to a surface of the member; said stress indicating means comprising a cavity extending inward from a substantially planar portion in the surface of the member and having a generally circular cross-section adjacent the surface, and a piece of brittle material therein and engaging the internal surface of the cavity at least around the rim thereof, and from there protruding substantially and noticeably beyond the rim, the size of the cavity and the shear characteristics of the brittle material being so selected that the predetermined stress causes the rim to pinch the brittle material sufficiently to shear it substantially in the plane of the rim so that the protruding portion separates from the portion within the cavity.

2. A member as in claim 1, having a plurality of said indicating means, each responsive to a different predetermined stress.

3. A member as in claim 1, having means around the protruding portion of brittle material for protecting it from accidental contact with external shearing force.

4. A member as in claim 1, wherein the outer surface of the protruding portion of brittle material has a substantially different appearance than the portion within the cavity.

5. A member as in claim 1, wherein the outer surface of the protruding portion of brittle material has a substantially different color than the portion within the cavity.

6. A member as in claim 1, wherein the visible area of the protruding portion of brittle material is substantially larger than the area within the rim of the cavity.

7. A member as in claim 1, wherein the cavity has substantially the shape of a right circular cylinder.

8. A member having a region that may be subject to compressive stress and means in said region for indicating that a predetermined magnitude of such stress has been encountered; said stress indicating means comprising a cavity having substantially the shape of a truncated cone extending inward from a substantially planar portion in the surface of the member, and a piece of brittle material therein fitted snugly against, and protruding beyond, the rim thereof, the predetermined stress causing the rim to pinch the brittle material, thus shearing it substantially in the plane of the rim so that the protruding portion separates from the portion within the cavity.

9. A member as in claim 8, wherein the piece of brittle material has a notch adjacent the rim of the cavity.

10. A member as in claim 1, wherein the compressive stress in said region is responsive to a bending moment in the member.

11. A member as in claim 1, wherein the compressive stress in said region is responsive to tensile stress in another portion of the member.

12. A member as in claim 11, comprising a bolt, wherein said region is in the outer portion of the head and the compressive stress in said region is responsive to tension in the shank.

13. A bolt as in claim 12, comprising means for providing a bending moment in the head responsive to tension in the shank.

14. A bolt as in claim 12, wherein a peripheral annular area of the inner surface of the head protrudes beyond an adjacent interior annular area thereof to provide a bending moment in the head when it is tightened against a substantially planar surface.

15. In combination, a bolt having a region in the outer portion of the head that may be subject to compressive stress responsive to tension in the shank and means in said region for indicating that a predetermined magnitude of such stress has been encountered; said stress indicating means comprising a cavity extending inward from a substantially planar portion in the outer surface of the head, and a piece of brittle material therein fitted snugly against, and protruding beyond, the rim thereof, the predetermined stress causing the rim to pinch the brittle material, thus shearing it substantially in the plane of the rim so that the protruding portion separates from the portion within the cavity;

and a washer having an interior annular portion that is thinner than an adjacent peripheral annular portion thereof, the thinner portion fitting coaxially around the shank of the bolt and the thicker portion contacting a peripheral annular area of the inner surface of the head of the bolt.

16. A member comprising a washer that is convex on one side and concave on the opposite side, having a region that may be subject to compressive stress and means in said region for indicating that a predetermined magnitude of such stress has been encountered; said stress indicating means comprising a cavity extending inward from a substantially planar portion in the convex surface of the member, and a piece of brittle material therein fitted snugly against, and protruding beyond, the rim thereof, the predetermined stress causing the rim to pinch the brittle material, thus shearing it substantially in the plane of the rim so that the protruding portion separates from the portion within the cavity.

17. A member comprising a Belleville-type washer, having a region in the convex portion thereof that may be subject to compressive stress and means in said region for indicating that a predetermined magnitude of such stress has been encountered; said stress indicating means comprising a cavity extending inward from a substantially planar portion in the surface of the member, and a piece of brittle material therein fitted snugly against, and protruding beyond, the rim thereof, the predetermined stress causing the rim to pinch the brittle material, thus shearing it substantially in the plane of the rim so that the protruding portion separates from the portion within the cavity.

* * * * *